United States Patent
Nishida (10) Patent No.: US 9,501,423 B2
(45) Date of Patent: Nov. 22, 2016

(54) PROGRAM EXECUTION DEVICE AND COMPILER SYSTEM

(71) Applicant: PANASONIC CORPORATION, Osaka (JP)

(72) Inventor: Yoshitaka Nishida, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 617 days.

(21) Appl. No.: 13/913,130

(22) Filed: Jun. 7, 2013

(65) Prior Publication Data

US 2013/0275716 A1    Oct. 17, 2013

Related U.S. Application Data (63) Continuation of application No. PCT/JP2011/004214, filed on Jul. 26, 2011.

(30) Foreign Application Priority Data

Jan. 12, 2011   (JP) .................................. 2011-004246

(51) Int. Cl.
*G06F 12/00* (2006.01)
*G06F 12/10* (2016.01)
*G06F 9/45* (2006.01)

(52) U.S. Cl.
CPC ......... *G06F 12/1027* (2013.01); *G06F 8/4441* (2013.01)

(58) Field of Classification Search
CPC ........................ G06F 8/4441; G06F 12/1027
See application file for complete search history.

(56) References Cited

U.S. PATENT DOCUMENTS

| 6,003,115 A | * | 12/1999 | Spear .................. G06F 12/0862 711/113 |
| 6,275,917 B1 | | 8/2001 | Okada |
| 2009/0019253 A1 | | 1/2009 | Stecher et al. |

FOREIGN PATENT DOCUMENTS

| JP | 09-062574 A | 3/1997 |
| JP | 2000-057054 A | 2/2000 |
| JP | 2007-286705 A | 11/2007 |
| JP | 2009-020881 A | 1/2009 |
| JP | 2010-191645 A | 9/2010 |

OTHER PUBLICATIONS

International Search Report issued in PCT/JP2011/004214, mailed Aug. 30, 2011.

(Continued)

*Primary Examiner* — Reginald Bragdon
*Assistant Examiner* — Hannah A Faye-Joyner
(74) *Attorney, Agent, or Firm* — McDermott Will & Emery LLP (57) ABSTRACT

A program execution device includes a program loader reading a machine language program including a machine language code and access frequency information; an address conversion table creator creating an address conversion table including entries, each of which indicates a relation between a logical address range and a physical address range; and a TLB register registering, in a TLB, an entry of the address conversion table storing a logical address range accessed according to the machine language code. When determining that the frequency of access to a logical address range is high based on the access frequency information, the address conversion table creator adjusts the size of an entry storing this logical address range to an appropriate size.

5 Claims, 10 Drawing Sheets

(56) References Cited

OTHER PUBLICATIONS

S. Kinishita, et al.: "An Implementation of Linux Super Page on Linux Kernel 2.6 and Performance Evaluatio", ISSN 0919-6072, Jan. 15, 2008, pp. 23-28.

J. Navarro, et al.: "Practical, transparent operating system support for superpages", ACM SIGOPS Operating System Review OSDI' 02: Proceedings of the 5th symposium or Operating systems design and implementation, 2002, vol. 36, Issue SI, pp. 89-104.

* cited by examiner

| LOGICAL ADDRESS | PHYSICAL ADDRESS | PAGE SIZE | LOCK CANDIDATE FLAG |
|---|---|---|---|
|  |  |  |  |
| 0xE0100 | 0x804AC | 16KB | 1 |
|  |  |  |  |
|  |  |  |  |
| 0xD0000 | 0x904DC | 4KB | 0 |
| 0xC0000 | 0xA04DC | 4KB | 0 |
|  |  |  |  |

13

| LOGICAL ADDRESS | PHYSICAL ADDRESS | PAGE SIZE |
|---|---|---|
| 0xE0100 | 0x804AC | 16KB |
|  |  |  |
|  |  |  |
| 0xD0000 | 0x904DC | 4KB |
| 0xC0000 | 0xA04DC | 4KB |
|  |  |  |
|  |  |  |

5

LOCK FIELD / NON-LOCK FIELD

```
int a[SIZE_A];
int b[SIZE_B];
int c[SIZE_C];
void func1( void )
{
  for ( ··· ) {
    a[ i ] = ··· ;
    func2();
    func3();
         :
}
void func2( void )
{
  for ( ··· ) {
    for ( ··· ) {
      b[ j ] = ··· ;
      func3();
      c[ j ] = ··· ;
         :
}
void func3( void )
{
  for ( ··· ) {
    for ( ··· ) {
      c[ k ] = ··· ;
         :
}
```

| FUNCTION NAME | NUMBER OF CALLS |
|---|---|
| func1 | 1 |
| func2 | 1 |
| func3 | 2 |

| FUNCTION NAME | ACCESSED VARIABLE AND NESTED LEVEL OF LOOP |
|---|---|
| func1 | (a,1) |
| func2 | (b,2), (c,2) |
| func3 | (c, 2) |

| VARIABLE | ACCESS FREQUENCY |
|---|---|
| a | m + n |
| b | m + 2n |
| c | 2m + 2n |

~38

PROGRAM EXECUTION DEVICE AND COMPILER SYSTEM

CROSS-REFERENCE TO RELATED APPLICATIONS

This is a continuation of International Application No. PCT/JP2011/004214 filed on Jul. 26, 2011, which claims priority to Japanese Patent Application No. 2011-004246 filed on Jan. 12, 2011. The entire disclosures of these applications are incorporated by reference herein.

BACKGROUND

The present disclosure relates to a program execution device, and more particularly to a technique for reducing a translation look-aside buffer (TLB) miss rate during program execution.

An application accessing a memory space that is enormous in size has increased in popularity in recent years due to the spread of full high definition (Full HD) equipment. In general, an application refers to a TLB for high-speed access to a memory. If a logical address to be accessed by the application is not in the TLB, it is a TLB miss.

If a TLB miss occurs, the application accesses an address conversion table managed by an operating system. Then, a logical address to be accessed and a physical address corresponding to this logical address are registered to a TLB entry from the address conversion table, and thus an overhead occurs. This results in reduction in an execution speed of the application.

Figure 10:
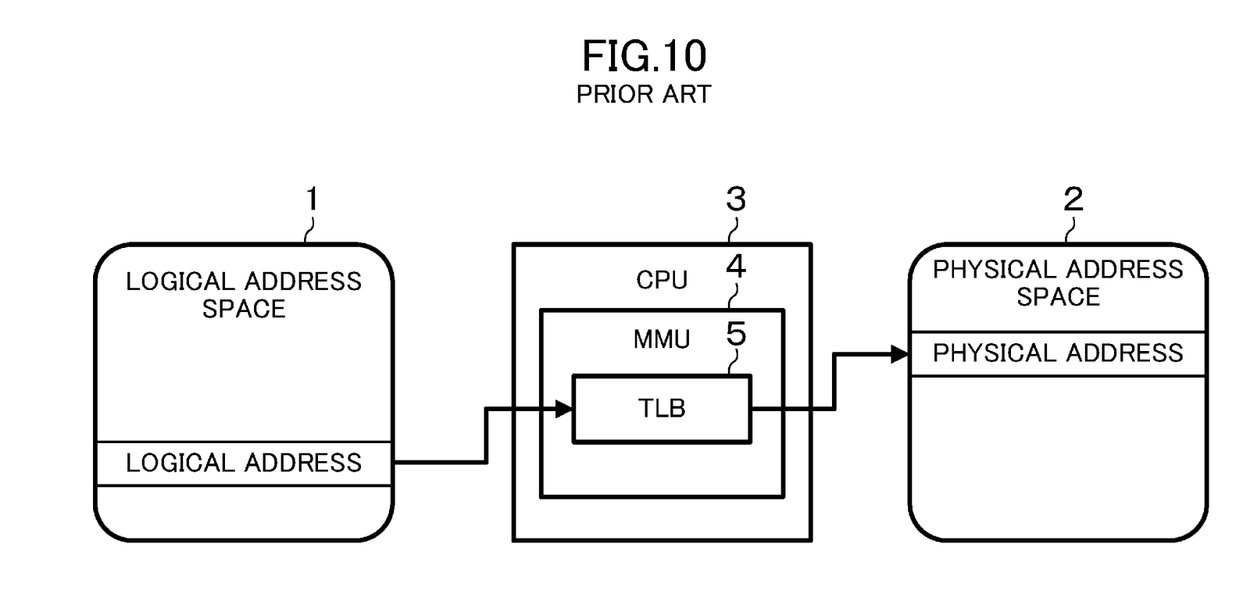
FIG. 10 is a schematic diagram of a conventional address converter.

FIG. 10 illustrates a conventional address conversion system. A central processing unit (CPU) 3 includes a memory management unit (MMU) 4 including a TLB 5 converting a logical address located in a logical address space 1 into a physical address located in a physical address space 2. Conventionally, a page size of a TLB entry is increased to expand an address range stored in the TLB entry in order to prevent occurrence of a TLB miss (see, e.g., Japanese Patent Publication No. 2000-57054 and Japanese Patent Publication No. 2010-191645).

SUMMARY

In the technique disclosed in Japanese Patent Publication No. 2000-57054, a page size of a TLB entry is determined based on the overall size where text portions of a plurality of programs are merged and the overall size where data portions of the plurality of programs are merged. In addition, in the technique disclosed in Japanese Patent Publication No. 2010-191645, a page size of a TLB entry is determined to have a size where the largest text portion in a plurality of programs can be stored. In such manners, in conventional techniques, as the size of a text portion etc. in a program becomes larger, a page size becomes larger.

A portion of a TLB entry that does not include a text portion is a wasted space because an address range not used by a program is mapped thereon. The wasted space might increase depending on a relation between the page size of a TLB entry and the size of a text portion etc. That is, in conventional techniques, finite TLB resources cannot be efficiently used, and thus, when a plurality of applications are concurrently executed, the TLB might not be able to store the address ranges accessed by these applications. Accordingly, while a TLB miss rate can decrease when a single application is executed, the TLB miss rate may increase when multiple applications are concurrently executed.

To solve this problem, a program execution device of the present disclosure executing a machine language program includes a program loader, an address conversion table creator, and a TLB register. The program loader reads the machine language program including a machine language code, and access frequency information associated with a logical address range accessed according to the machine language code and the frequency of access to the logical address range. The address conversion table creator creates an address conversion table including entries, each of which indicates a relation between a logical address range and a physical address range. The TLB register registers, in a TLB, an entry of the address conversion table storing a logical address range accessed according to the machine language code. When determining that the frequency of access to a logical address range is high based on the access frequency information, the address conversion table creator adjusts the size of an entry storing this logical address range to an appropriate size.

In this program execution device, the address conversion table creator can adjust the size of an entry of the address conversion table storing a logical address range having a high access frequency to a size appropriate for this logical address range. Then, the TLB register, in the TLB, an entry of the address conversion table. Thus, the size of a TLB entry storing a logical address range having a high access frequency can be adjusted to a size appropriate for this logical address range. That is, even if a plurality of applications access a plurality of logical address ranges, the size of a TLB entry storing a logical address range having a high access frequency is adjusted to a large size appropriate for this logical address range. Therefore, the TLB can be efficiently used, and a TLB miss can be reduced.

Preferably, the address conversion table creator selects, as a lock candidate, an entry of the address conversion table storing a logical address range including a high access frequency. The TLB register registers, in a lock field of the TLB, the entry of the address conversion table selected as a lock candidate.

In this case, the TLB entry storing a logical address range having a high access frequency is locked, and thus the contents in this TLB entry are protected from being changed. This further reduces a TLB miss.

In addition, a compiler system of the present disclosure compiling a source program and generating a machine language program includes an access frequency analyzer and an output portion. The access frequency analyzer analyzes the source program and obtains the frequency of access to a logical address range accessed by at least one variable in the source program. The output portion associates the logical address range with the access frequency, generates the access frequency information, and outputs the machine language program including the access frequency information and the machine language code.

This compiler system generates a machine language program including access frequency information and a machine language code. Then, when the program execution device executes the machine language code included in the machine language program, a TLB miss is reduced. This improves the speed for executing the machine language code.

DETAILED DESCRIPTION

Figure 1:
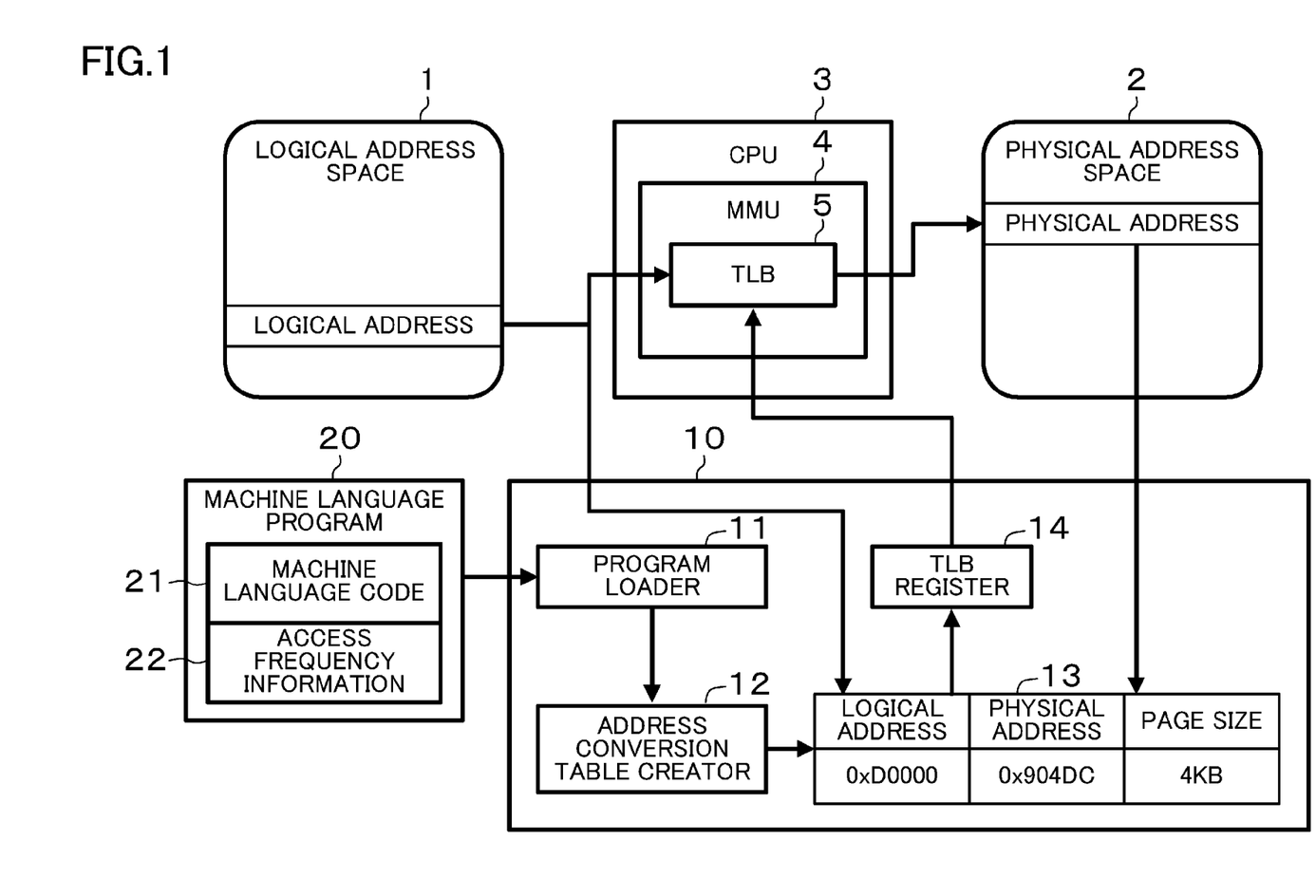
FIG. 1 is a schematic diagram of an address converter including a program execution device of one embodiment of the present disclosure.

FIG. 1 is a block diagram of an address converter including a program execution device of one embodiment of the present disclosure. The address converter illustrated in FIG. 1 includes a CPU 3 and an operating system (hereinafter referred to as OS) 10 serving as a program execution device.

The CPU 3 includes an MMU 4 including a TLB 5 converting a logical address located in a logical address space 1 into a physical address located in a physical address space 2. The TLB 5 includes entries, each of which is associated with a logical address, a physical address, and a page size. That is, each of the entries in the TLB 5 can store a logical address range and a physical address range of which sizes are indicated by the page size. In this embodiment, the entries of the TLB 5 are, e.g., updated by software processing of the OS 10.

The OS 10 reads and executes a machine language program 20. Specifically, the OS 10 includes a program loader 11, an address conversion table creator 12, an address conversion table 13, and a TLB register 14. The program loader 11 loads the machine language program 20, and then outputs access frequency information 22 to the address conversion table creator 12, while outputting a machine language code 21 serving as an executable file to a program executor (not shown). The program loader 11 can concurrently load a plurality of machine language programs 20. The access frequency information 22 relates to a relation between at least one logical address range accessed by the machine language code 21 and a frequency of access to this logical address range.

The address conversion table creator 12 creates the address conversion table 13 including entries, each of which is associated with a logical address located in the logical address space 1, a physical address located in the physical address space 2, and a page size. That is, each of the entries of the address conversion table 13 can store a logical address range and a physical address range of which sizes are indicated by the page size. In addition, the address conversion table creator 12 determines whether the frequency of access to a logical address range is high or not based on the access frequency information 22. The address conversion table creator 12 can determine, for example, whether or not the frequency of access to a logical address range is relatively high, or whether or not this frequency is higher than the threshold value thereof. When determining that a frequency of access to a logical address range is high, the address conversion table creator 12 adjusts the page size of the entry of the address conversion table 13 storing this logical address range to an appropriate size. This optimizes the address conversion table. The address conversion table creator 12 may create the address conversion table 13 such that the entries are sorted in ascending or descending order of the access frequency.

The TLB register 14 registers, in the TLB 5, an entry of the address conversion table 13 storing a logical address range accessed according to the machine language code 21. That is, the page size of the TLB entry storing the logical address range having a high access frequency is adjusted to a size appropriate for this logical address range.

Figure 2:
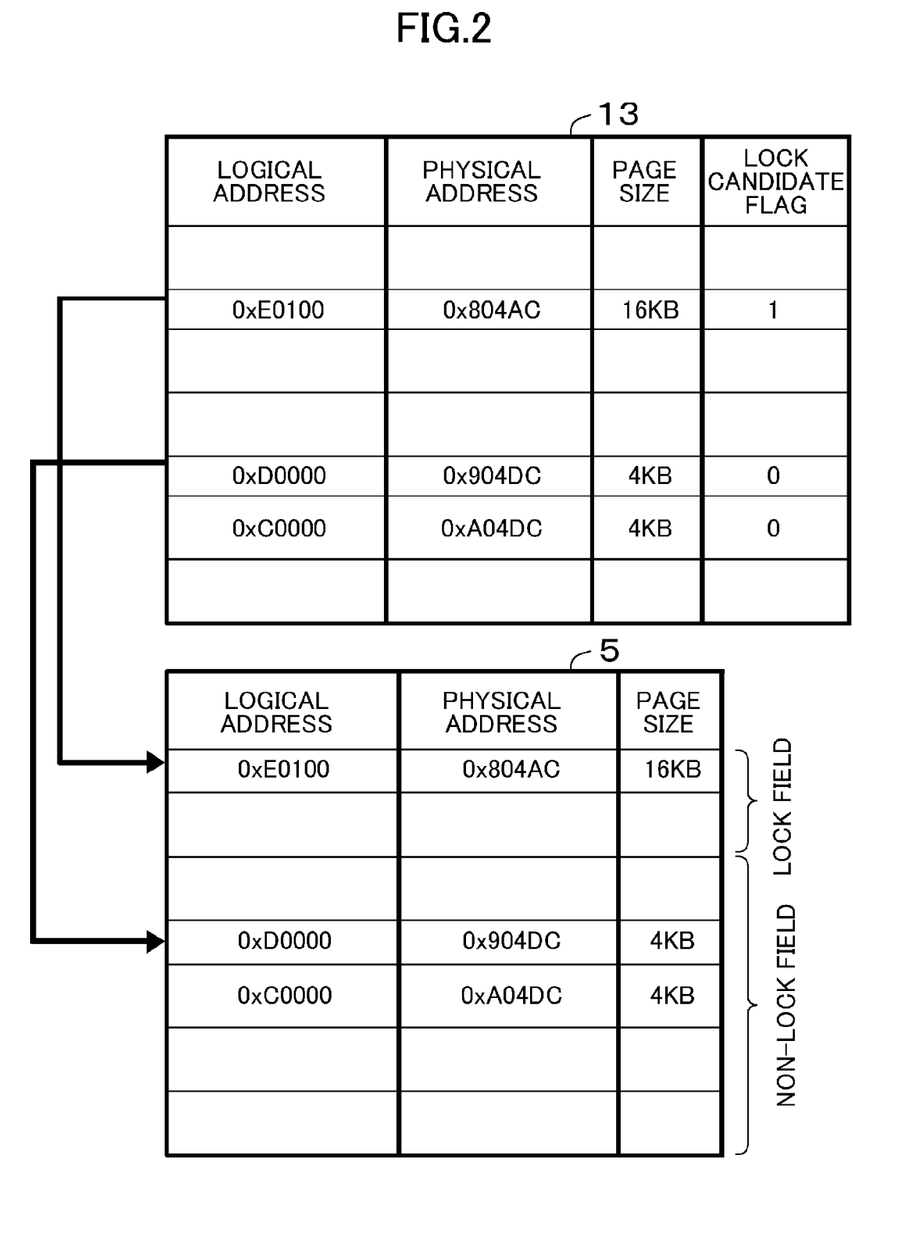
FIG. 2 is a diagram showing a relation between an address conversion table and a TLB.

The address conversion table creator 12 may detect, based on the access frequency information 22, a logical address range that is most frequently accessed during execution of the machine language code 21, and then select the entry storing the determined logical address range as a lock candidate. Specifically, as illustrated in FIG. 2, a lock candidate flag indicating whether an entry is a lock candidate or not is added to the address conversion table 13. The address conversion table creator 12 sets a lock candidate flag to, e.g., "1" when selecting an entry of the address conversion table 13 as a lock candidate, and sets a lock candidate flag to, e.g., "0" when selecting an entry as a non-lock candidate. The TLB register 14 registers, in a lock field of the TLB 5, a logical address range and a physical address range that are stored in an entry of the address conversion table 13 of which the lock candidate flag is "1." In addition, the TLB register 14 registers, in a non-lock field of the TLB 5, an entry of which the lock candidate flag is "0." Here, the lock field is an entry of the TLB 5 that is protected from being overwritten with a newly registered entry.

Figure 3:
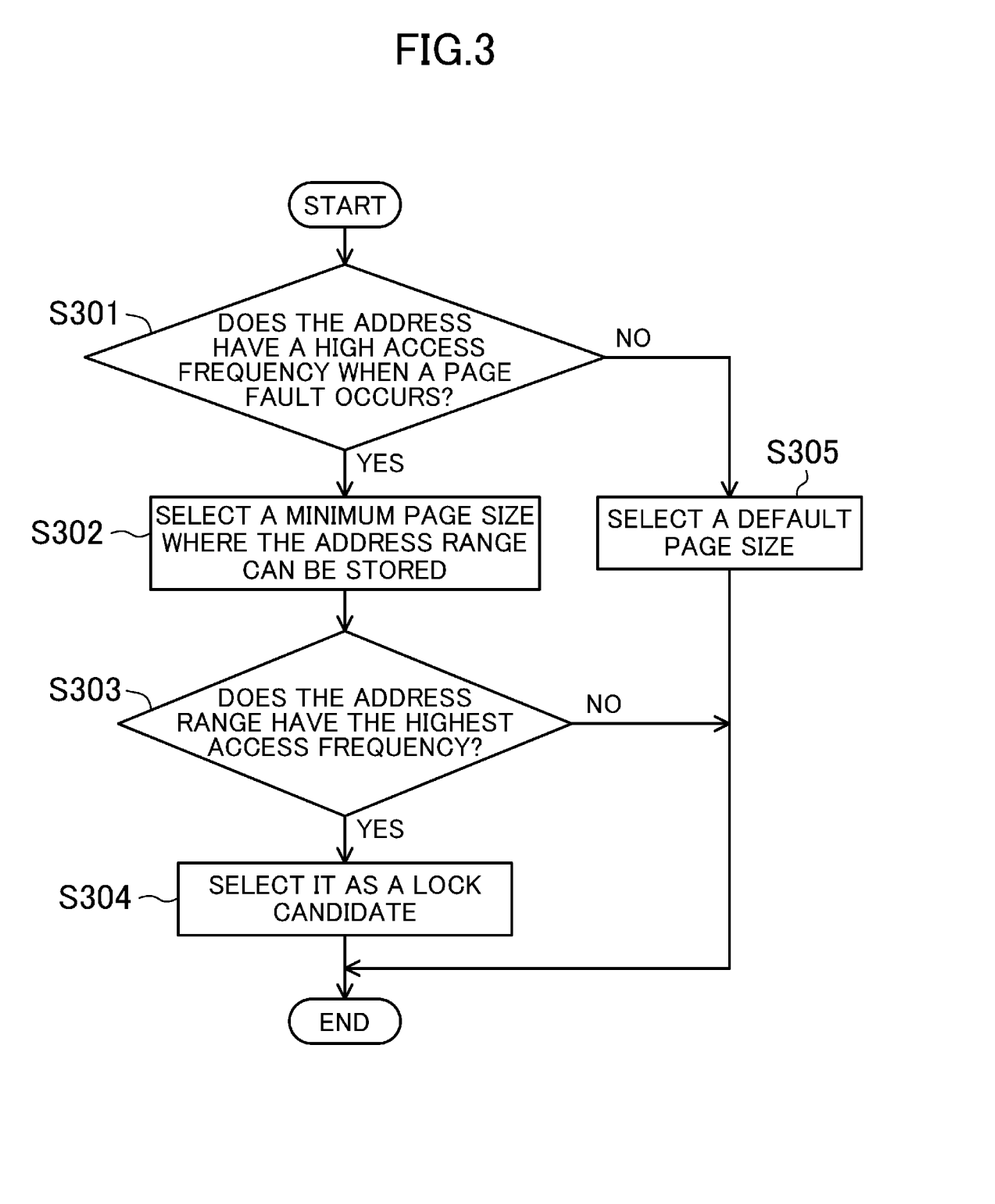
FIG. 3 is a flow chart showing an example of processing in an address conversion table creator.

Next, an example of processing in the address conversion table creator 12 will be described with reference to FIG. 3. Specifically, an example of a page fault occurring when the plurality of logical address ranges are accessed according to the machine language code 21 will be described. A page fault occurs when, in the address conversion table 13, an accessed logical address range is not mapped in a physical address range.

First, when a page fault occurs, it is determined based on the access frequency information 22 whether or not the logical address range accessed according to the machine language code 21 has a high access frequency (S301). If the logical address range has a high access frequency ("Yes" in S301), a minimum page size where this logical address range can be stored is selected. If any page size of, e.g., 4 KB, 8 KB, 16 KB, or 32 KB is selectable, and the page size of the logical address range having a high access frequency is 10 KB, the page size of 16 KB is selected. Then, a physical address of the selected page size is obtained from the physical address space 2, and stored in an entry of the address conversion table 13 (S302). This causes the logical address range relating to the page fault to be mapped in the physical address range.

After that, it is determined whether or not a logical address range that is included in the plurality of logical address ranges accessed according to the machine language code 21 and is accessed when the page fault occurs has the highest access frequency (S303). If this logical address range has the highest access frequency (Yes in S303), the entry storing this logical address range is selected as a lock candidate (S304). In other words, the lock candidate flag of this entry is set to "1." On the other hand, if the logical address range accessed when a page fault occurs does not have the highest access frequency (No in S303), the lock candidate flag of the entry storing this address range is set to "0."

On the other hand, if the logical address range accessed according to the machine language code 21 does not have a high access frequency when a page fault occurs (No in S301), 4 KB is selected as a default page size, for example (S305).

As described above, the page size of an entry of the address conversion table 13 storing a logical address range having a high access frequency is increased, and thus internal fragmentation is less likely to occur. While an entry storing a logical address range having the highest access frequency is selected as a lock candidate in S303 and S304, an entry storing a logical address range having an access frequency higher than or equal to a threshold value may be selected as a lock candidate.

Figure 4:
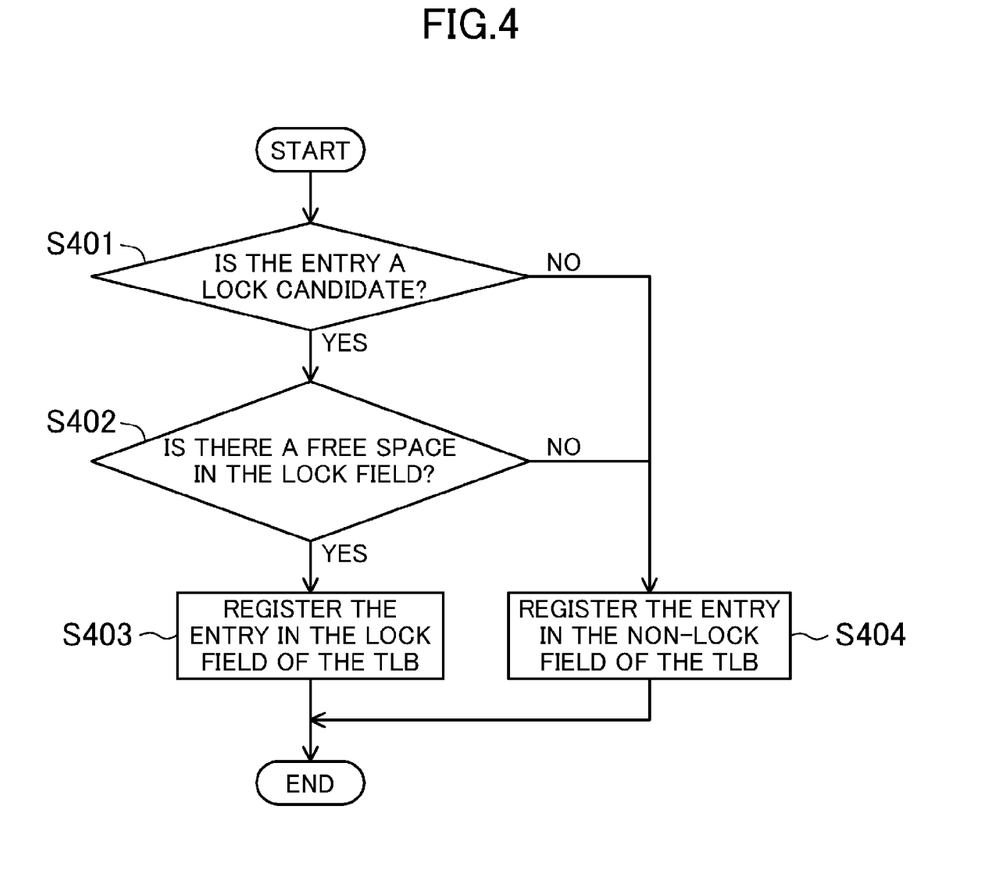
FIG. 4 is a flow chart showing an example of processing in a TLB register.

Next, an example of processing in the TLB register 14 will be described with reference to FIG. 4. First, the TLB register 14 refers to the lock candidate flag in the address conversion table 13 to determine whether an entry of the address conversion table 13 to be registered in the TLB 5 is a lock candidate or not (S401). If the entry is a lock candidate (Yes in S401), it is determined whether or not there is free space in the lock field of the TLB 5 (S402). If there is free space in the lock field of the TLB 5 (Yes in S402), the entry of the address conversion table 13 that is a lock candidate is registered in the lock field of the TLB 5 (S403). If there exist a plurality of entries that are lock candidates, these entries may be registered in the lock field of the TLB 5 in order of processing of the TLB register 14. If there is no free space in the lock field of the TLB 5 (No in S402), the entry of the address conversion table 13 that is a lock candidate is registered in the non-lock field of the TLB 5 (S404).

On the other hand, if an entry of the address conversion table 13 to be registered in the TLB 5 is not a lock candidate (No in S401), this entry is registered in the non-lock field of the TLB 5 (S404).

That is, the OS 10 of this embodiment increases the page size of only a TLB entry storing a frequently accessed logical address range regardless of an increase in the number of logical address ranges, thereby efficiently using the TLB 5. Accordingly, a TLB miss can be reduced. Moreover, a lock of a TLB entry storing a logical address range having a high access frequency enables a TLB hit to occur every time this logical address range is accessed.

Note that when the OS 10 has completed processing of the machine language code 21, the TLB register 14 preferably moves, to the non-lock field, an entry that is registered in the lock field of the TLB 5 and referred to during execution of the machine language code 21. In this case, the address conversion table creator 12 changes, from a lock candidate to a non-lock candidate, the entry of the address conversion table 13 corresponding to the entry moved to the non-lock field of the TLB 5.

Figure 5:
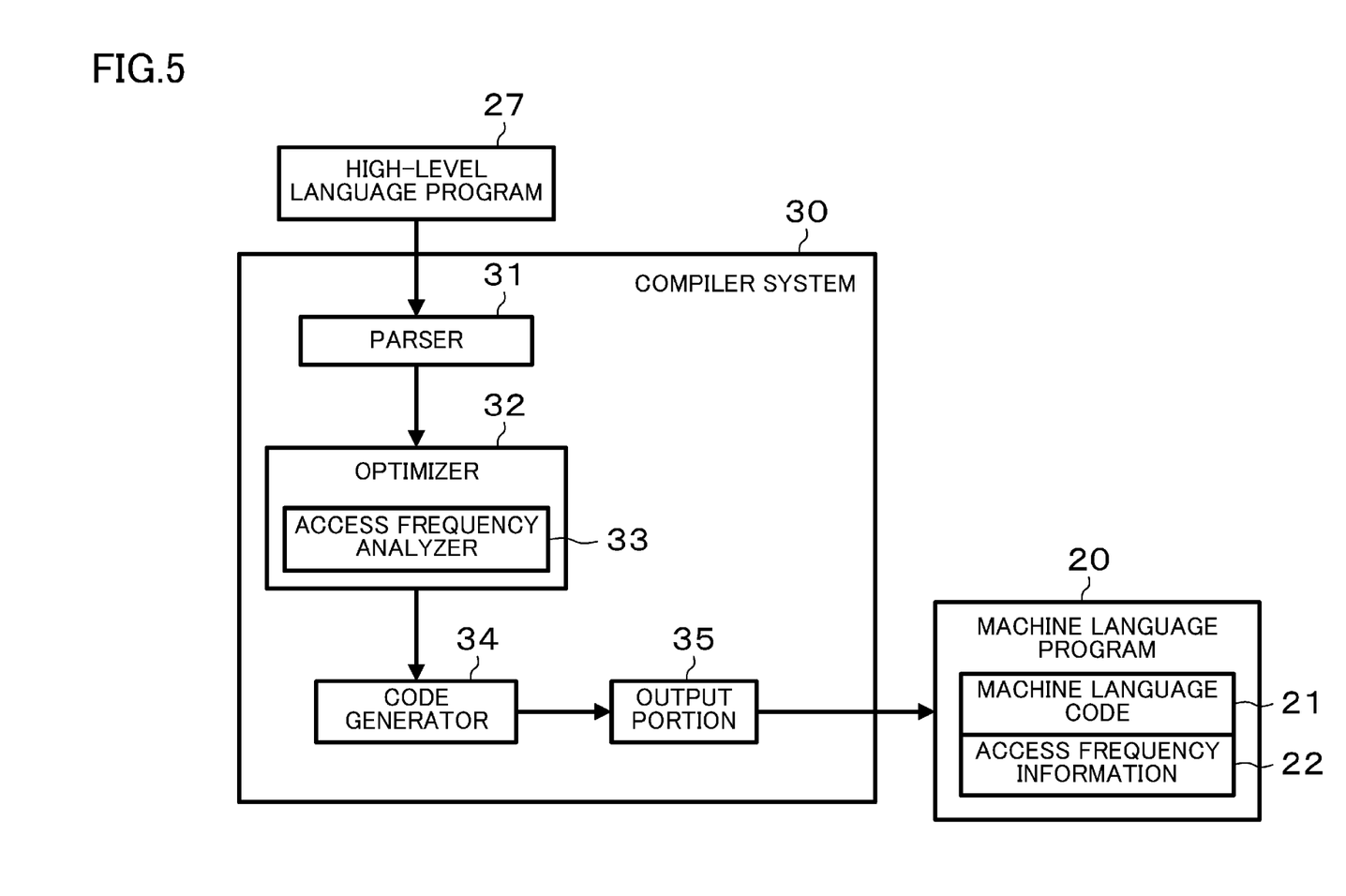
FIG. 5 is a block diagram showing a configuration of a compiler system of one embodiment of the present disclosure.

FIG. 5 is a block diagram showing a configuration of a compiler system generating the machine language program 20 illustrated in FIG. 1. A compiler system 30 illustrated in FIG. 5 compiles a high-level language program 27, which is a source program, to generate the machine language program 20. The compiler system 30 includes a parser 31, an optimizer 32, a code generator 34, and an output portion 35.

Figure 6:
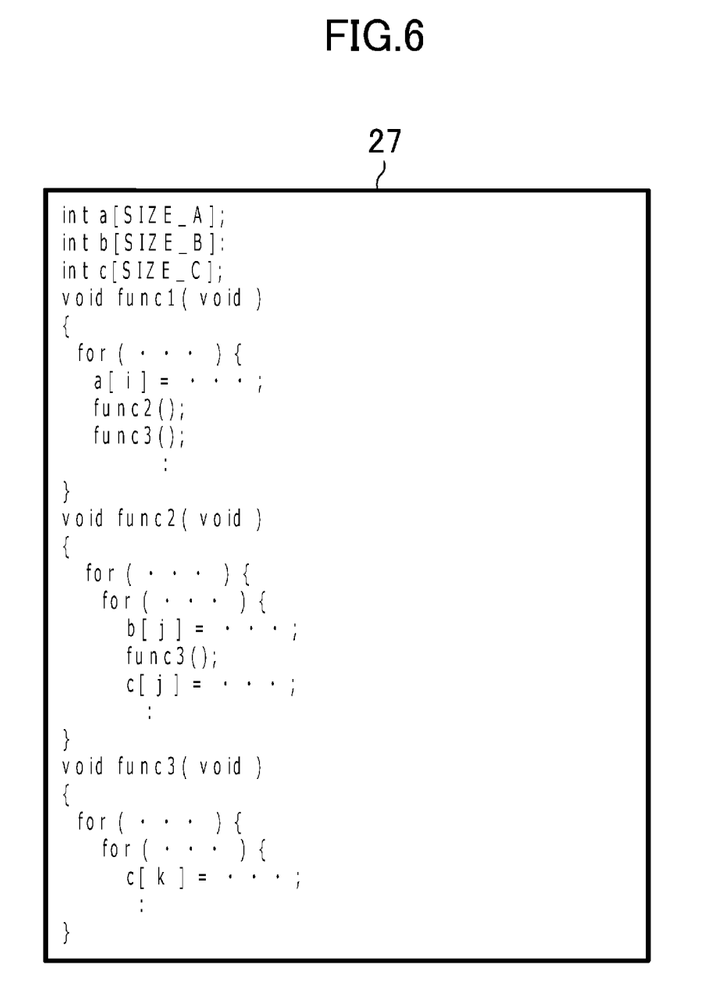
FIG. 6 illustrates an example of a high-level language program input to the compiler system of FIG. 5.

The parser 31 splits the high-level language program 27 written in the C language etc. illustrated in FIG. 6 into tokens, and then analyzes a structure of the high-level language program 27 based on the split tokens to generate an intermediate code.

Referring back to FIG. 5, the optimizer 32 converts the intermediate code into an efficient code to minimize time etc. during which the machine language code 21 is executed. In addition, the optimizer 32 includes an access frequency analyzer 33. The access frequency analyzer 33 extracts information about variables a, b, and c used in the high-level language program 27 illustrated in FIG. 6. Specifically, logical address ranges accessed by the variables a, b, and c are obtained based on start addresses and sizes of the variables a, b, and c. Moreover, the access frequency analyzer 33 calculates the frequency of access of the variables a, b, and c to the obtained logical address ranges. The access frequency analyzer 33 may be provided outside the optimizer 32. In this case, the optimizer 32 is optional.

Referring back to FIG. 5, the code generator 34 generates the machine language code 21. The output portion 35 associates a logical address range with its access frequency to generate the access frequency information 22, and then outputs the machine language program 20 illustrated in FIG. 7 and including the machine language code 21 and the access frequency information 22. Here, reference numeral 23 in the access frequency information 22 illustrated in FIG. 7 denotes the start addresses of the variables a, b, and c in the high-level language program 27. Reference numeral 24 denotes the sizes of the variables a, b, and c. Reference numeral 25 denotes the access frequencies of the variables a, b, and c. The logical address range is indicated by the start addresses 23 and the sizes 24 of the variables a, b, and c. The output portion 35 may separate the access frequency information 22 from the machine language program 20 to output the access frequency information 22 to another file.

Next, an example of calculation of the access frequencies 25 by the access frequency analyzer 33 will be described with reference to FIGS. 8 and 9A-9C.

Figure 9A:
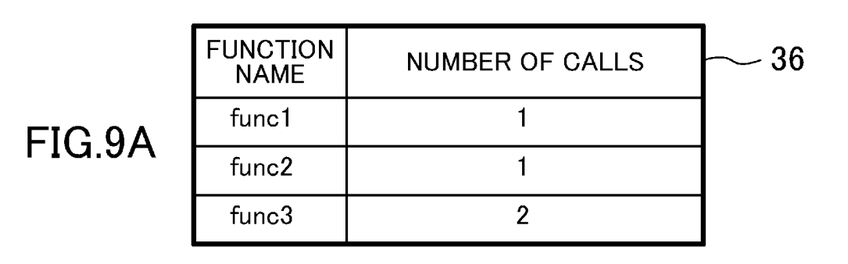
FIGS. 9A-9C are tables used in the course of calculating access frequencies.

First, it is determined whether or not the high-level language program 27 contains a function not registered in a table 36 illustrated in FIG. 9A (S801). If there is a function not registered in the table 36 (Yes in S801), the name of this function and the total number of calls of this function are registered in the table 36 (S802). For example, in FIG. 6, a function func 1 is called only once in the high-level language program 27, and thus the total number of calls is "1." Then, a variable used in a function of the high-level language program 27 and, if any, a nested level of a loop in which this variable appears are associated with the name of the function, and then registered in the table 37 illustrated in FIG. 9B (S803). For example, in FIG. 6, the nested level of the loop in which the variable a appears in the function func 1 is "1." Thus, "(a, 1)" is associated with the function func 1, and registered in the table 37. The process subsequently returns to step S801 to repeat from step S801 to step S803. In such a manner, the tables 36 and 37 are created. Note that if a variable appears outside the loop, the nested level thereof only has to be "1."

Figure 9B:
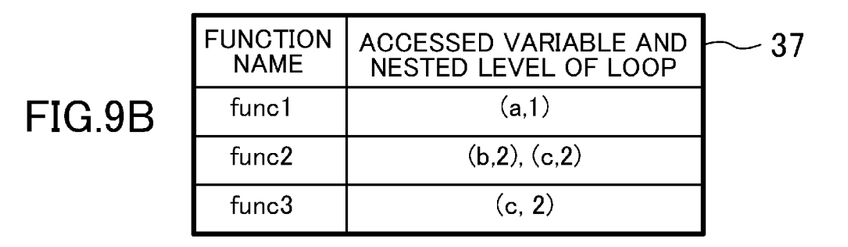

On the other hand, if there is no function not registered in the table 36 (No in S801), an access frequency is calculated based on the tables 36 and 37 (S804). Specifically, regarding a function name common to the tables 36 and 37, an access frequency f can be calculated by the equation: f=the number of calls of a function in the table 36×m+the nested level of a loop in the table 37×n, where the parameter m represents the weight of the number of calls of a function in the table 36, and the parameter n represents the weight of the nested level of a loop in the table 37.

Figure 7:
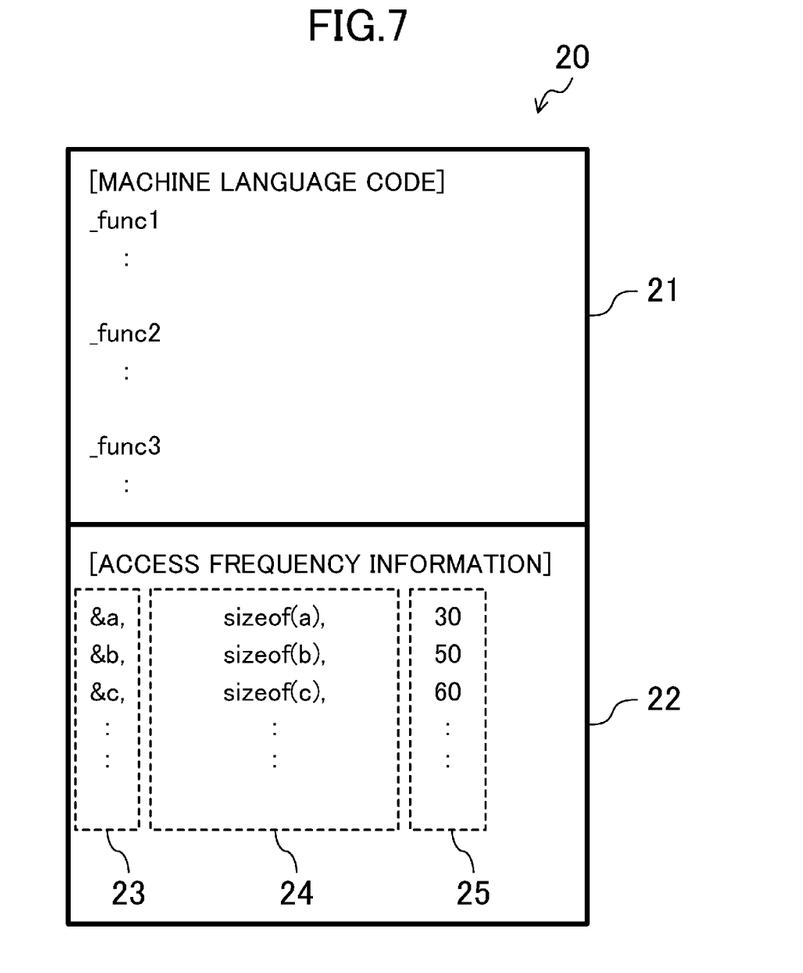
FIG. 7 illustrates an example of a machine language code and access frequency information generated by the compiler system of FIG. 5.
Figure 8:
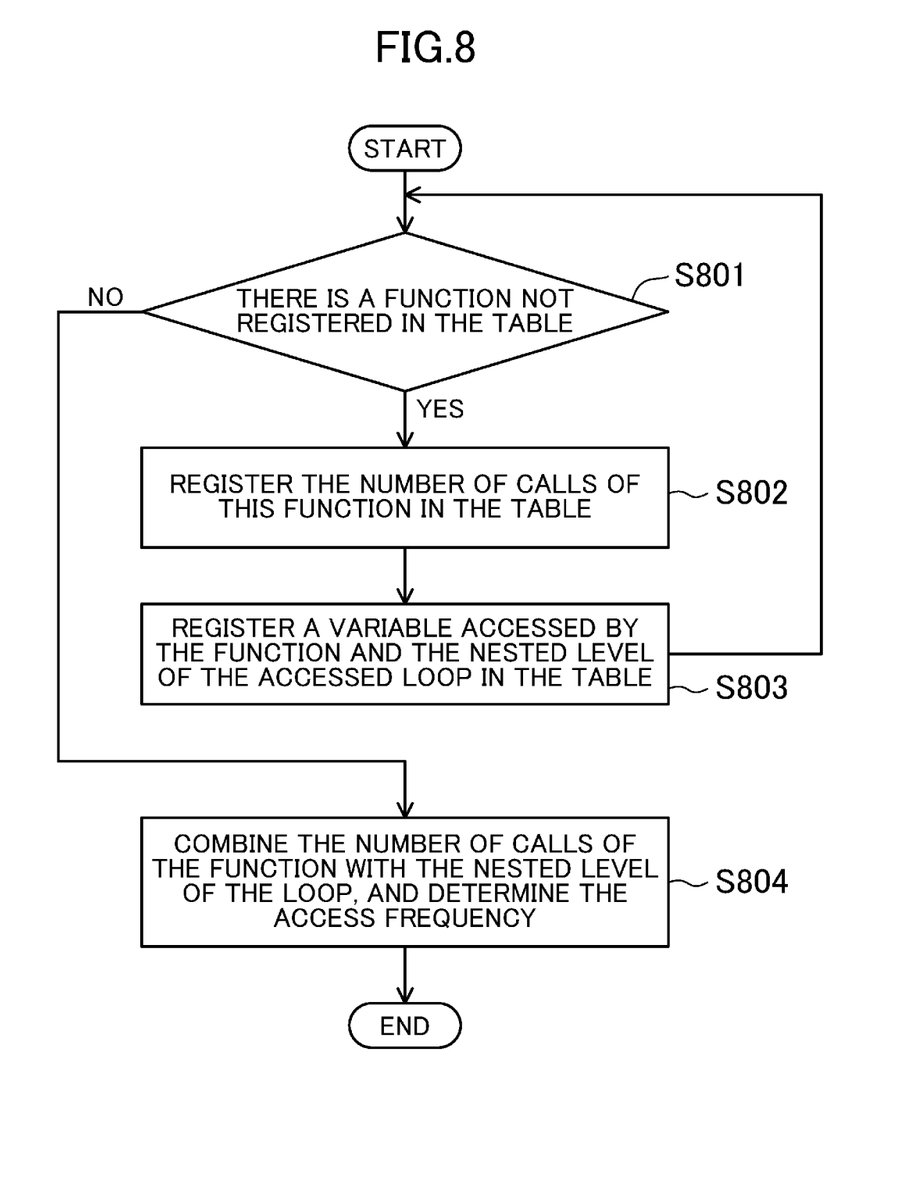
FIG. 8 is a flow chart showing an example of processing in an access frequency analyzer.
Figure 9C:
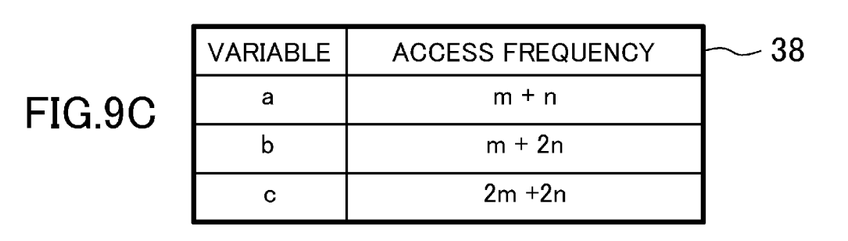

Thus, from the tables 36 and 37, access frequencies fa, fb, and fc of the variables a, b, and c used in the high-level language program 27 illustrated in FIG. 6 can be calculated by $$fa = 1 \times m + 1 \times n = m + n,$$

$$fb = 1 \times m + 2 \times n = m + 2n, \text{ and}$$

$$fc = 2 \times m + 2 \times n = 2m + 2n,$$

respectively. The variables a, b, and c, and the access frequencies thereof are subsequently registered in the table 38 illustrated in FIG. 9C. Here, the access frequencies 25 illustrated in FIG. 7 are values determined by $$fa = m + n = 10 + 20 = 30,$$

$$fb = m + 2n = 10 + 2 \times 20 = 50, \text{ and}$$

$$fc = 2m + 2n = 2 \times 10 + 2 \times 20 = 60,$$

where the parameter m is 10 and the parameter n is 20.

In such a manner, a TLB miss rate can be minimized when the OS 10 illustrated in FIG. 1 executes the machine language program 20 generated by the compiler system 30 of this embodiment.

Generally, in many high-level language programs, a nested level of a loop in which a variable appears, and the number of calls of at least one function for which the variable is used are static, and the number of loops is dynamic. When the nested level of a loop and the number of calls of at least one function increase, the access frequencies 25 increase. Thus, the access frequencies 25 are preferably calculated based on the nested level of a loop and the number of calls of at least one function. Alternatively, the access frequencies 25 may be calculated based on only the number of calls of at least one function. In addition, the values of the parameters m and n are arbitrary.

Note that if the number of a loop in which a variable appears is static in a high-level language program, this number of a loop may serve as the access frequency 25. In addition to the number of calls of at least one function and a nested level of a loop, the compiler system 30 may read, from a profile etc., dynamic information affecting fluctuations of the access frequencies 25 to calculate the access frequencies 25.

What is claimed is:

1. A program execution device configured to execute a machine language program, the program execution device comprising:
    a program loader configured to read the machine language program, the machine language program including a machine language code and access frequency information associated with a logical address range accessed according to the machine language code and the frequency of access to the logical address range;
    an address conversion table creator configured to create an address conversion table including entries, each of which indicates a relation between a logical address range and a physical address range; and
    a translation look-aside buffer (TLB) register configured to register, in a TLB, an entry of the address conversion table storing a logical address range accessed according to the machine language code, wherein
    when determining that the frequency of access to a logical address range is high based on the access frequency information, the address conversion table creator adjusts the size of an entry storing this logical address range to an appropriate size.

2. The program execution device of claim 1, wherein the address conversion table creator adjusts the size of an entry of the address conversion table storing a logical address range having a high access frequency to a minimum size where this logical address range can be stored.

3. The program execution device of claim 1, wherein the address conversion table creator selects, as a default size, a size of an entry of the address conversion table storing a logical address range having a low access frequency.

4. The program execution device of claim 1, wherein
    the address conversion table creator selects, as a lock candidate, an entry of the address conversion table storing a logical address range to which the frequency of access is higher than or equal to a threshold value, and
    the TLB register registers, in a lock field of the TLB, the entry of the address conversion table selected as a lock candidate.

5. The program execution device of claim 1, wherein the address conversion table creator creates the address conversion table such that the entries of the address conversion table are sorted in order of the access frequency.

* * * * *